(12) United States Patent
Wang

(10) Patent No.: US 10,069,434 B2
(45) Date of Patent: Sep. 4, 2018

(54) POWER SUPPLY SYSTEM CAPABLE OF SWITCHING CONTROL POWER SOURCE OF POWER CONTROL MODULE

(71) Applicant: 3Y POWER TECHNOLOGY (TAIWAN), INC., Taoyuan (TW)

(72) Inventor: Chuan-Kai Wang, Taoyuan (TW)

(73) Assignee: 3Y POWER TECHNOLOGY (TAIWAN), INC., Taoyuan (TW)

( * ) Notice: Subject to any disclaimer, the term of this patent is extended or adjusted under 35 U.S.C. 154(b) by 228 days.

(21) Appl. No.: 15/187,801

(22) Filed: Jun. 21, 2016

(65) Prior Publication Data

US 2017/0018927 A1    Jan. 19, 2017

(30) Foreign Application Priority Data

Jul. 13, 2015   (TW) .............................. 104122490 A

(51) Int. Cl.
| | | |
|---|---|---|
| *H02M 7/04* | (2006.01) | |
| *H02M 1/00* | (2006.01) | |
| *H02M 1/42* | (2007.01) | |
| *H02M 1/44* | (2007.01) | |
| H02J 3/38  | (2006.01) | |

(52) U.S. Cl.
CPC .............. *H02M 7/04* (2013.01); *H02J 3/386* (2013.01); *H02M 1/42* (2013.01); *H02M 1/44* (2013.01); *H02M 2001/008* (2013.01); *Y02B 70/12* (2013.01); *Y02E 10/763* (2013.01)

(58) Field of Classification Search
CPC ...................................................... H02M 7/04
See application file for complete search history.

(56) References Cited

U.S. PATENT DOCUMENTS

| 2009/0236916 A1* | 9/2009 | Nishimura | ................ | H02J 7/35 |
| | | | | 307/80 |
| 2012/0099352 A1* | 4/2012 | Motegi | ................... | H02J 3/383 |
| | | | | 363/65 |

\* cited by examiner

*Primary Examiner* — Jared Fureman
*Assistant Examiner* — James Evans
(74) *Attorney, Agent, or Firm* — Winston Hsu

(57) ABSTRACT

A power supply system includes a power conversion circuit, a conversion control circuit, an auxiliary power module, an electricity supply module and a power supply control circuit. The power conversion circuit converts an input power into an output power used as an output of the power supply system. The conversion control circuit is arranged for controlling an operation of the power conversion circuit according to a control power. The auxiliary power module is arranged for selectively outputting a first electrical power to the conversion control circuit. The electricity supply module is arranged for providing a second electrical power. The power supply control circuit is coupled to the auxiliary power module and the electricity supply module, and arranged for referring to at least the second electrical power to determine whether to provide the first electrical power or the second electrical power as the control power for the conversion control circuit.

9 Claims, 4 Drawing Sheets

US 10,069,434 B2

POWER SUPPLY SYSTEM CAPABLE OF SWITCHING CONTROL POWER SOURCE OF POWER CONTROL MODULE

BACKGROUND OF THE INVENTION

1. Field of the Invention

The disclosed embodiments of the present invention relate to power control, and more particularly, to a power supply system capable of selectively switching a supply source of a control power required by a power control module.

2. Description of the Prior Art

In a conventional switching power supply, a main power conversion circuit (e.g. a power factor correction circuit and a power conversion circuit) is used for providing a power output, and an auxiliary power module is used for providing a control power required by a control module of the main power conversion circuit in order to help activate the main power conversion circuit, wherein the auxiliary power module further provides a power output in a standby mode (the main power conversion circuit is turned off). As the power output in the standby mode is only required to maintain basic operations, the auxiliary power module employs a low conversion efficiency structure to reduce manufacturing costs. For example, a flyback circuit structure is utilized to implement the auxiliary power module, wherein conversion efficiency of the flyback circuit structure is about 70%. However, low conversion efficiency represents high internal loss. This causes a large amount of power losses in the auxiliary power module, and degrades total conversion efficiency of the switching power supply.

Thus, there is a need for a novel power conversion structure to realize a power supply system having high conversion efficiency.

SUMMARY OF THE INVENTION

It is therefore one objective of the present invention to provide a power supply system capable of selectively switching a supply source of a control power required by a power control module to solve the above problems.

It is another objective of the present invention to provide a power supply system, which converts a wind energy (e.g. generated by a fansink module) into an electrical power used as a control power required by a power control module, to thereby replace an auxiliary power module of a power supply device with the power supply system to increase power conversion efficiency.

According to an embodiment of the present invention, an exemplary power supply system is disclosed. The exemplary power supply system comprises a power conversion circuit, a conversion control circuit, an auxiliary power module, an electricity supply module and a power supply control circuit. The power conversion circuit is arranged for converting an input power into an output power, wherein the output power is used as an output of the power supply system. The conversion control circuit is coupled to the power conversion circuit, and is arranged for controlling an operation of the power conversion circuit according to a control power. The auxiliary power module is coupled to the conversion control circuit, and is arranged for selectively outputting a first electrical power to the conversion control circuit. The electricity supply module is coupled to the conversion control circuit, and is arranged for providing a second electrical power. The power supply control circuit is coupled to the auxiliary power module and the electricity supply module, and is arranged for referring to at least the second electrical power to determine whether to provide the first electrical power or the second electrical power as the control power for the conversion control circuit.

The proposed power supply system may adaptively turn off an auxiliary power module to reduce power losses, and recycle and reuse energy to increase an output power. Hence, the proposed power supply system may realize a flexible power supply mechanism, and increase power conversion efficiency almost without additional costs.

These and other objectives of the present invention will no doubt become obvious to those of ordinary skill in the art after reading the following detailed description of the preferred embodiment that is illustrated in the various figures and drawings.

DETAILED DESCRIPTION

In order to satisfy requirements for low cost and high conversion efficiency, the proposed power supply system may adaptively provide one of a power supplied by an auxiliary power module and a power supplied by an electricity supply module (different from the auxiliary power module) to a conversion control module of a main power conversion circuit, wherein an operation of the electricity supply module does not cause power losses in the main power conversion circuit and the auxiliary power module. For example, in a first power supply mode, a power required by the conversion control module is supplied by the electricity supply module, while the auxiliary power module may stop supplying an electrical power (e.g. entering a sleep mode); in a second power supply mode, the power required by the conversion control module is supplied by the auxiliary power module, while the electricity supply module may collect an electrical power. The proposed power supply system may selectively switch a power supply mode (e.g. the aforementioned first power supply mode and second power supply mode) according to electric power output information of the electricity supply module and/or electric power output information of the auxiliary power module, thus increasing power conversion efficiency almost without additional costs. Further description is provided below.

Figure 1:
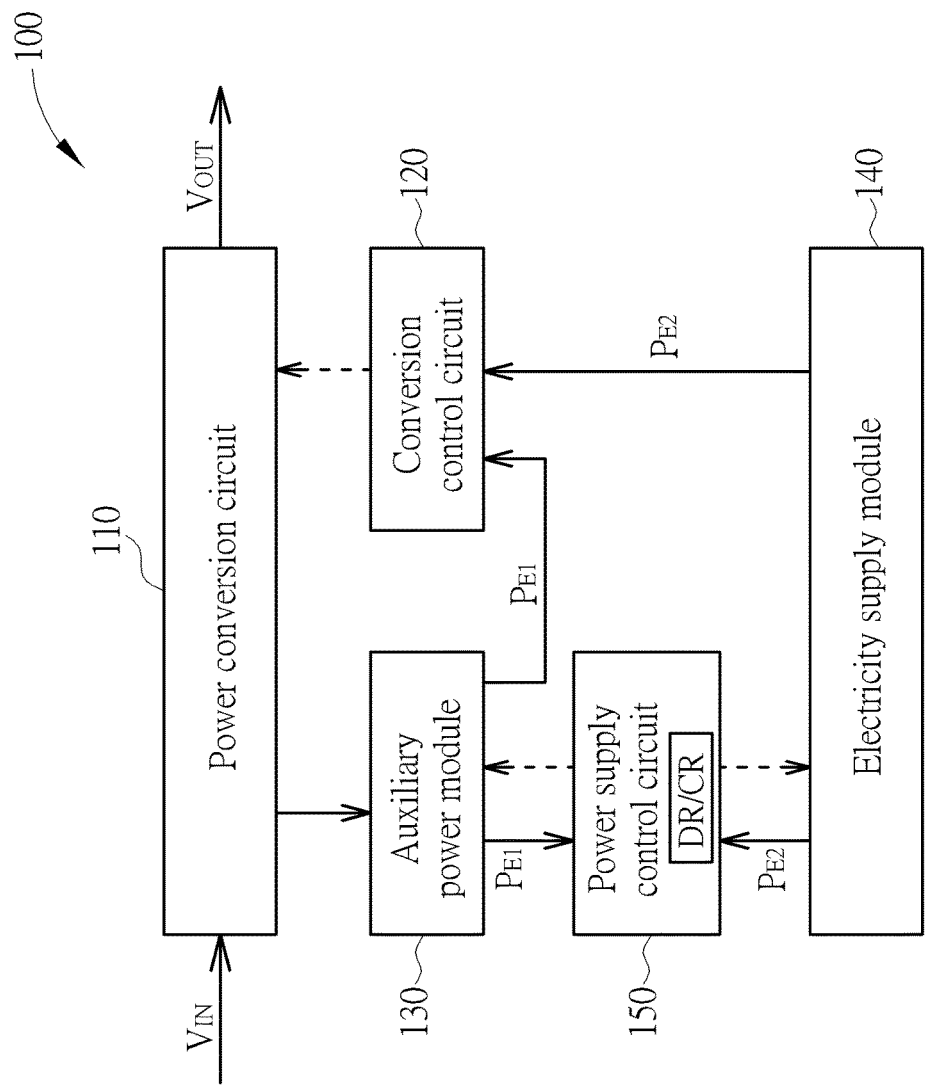
FIG. 1 is a block diagram illustrating an exemplary power supply system according to an embodiment of the present invention.

Please refer to FIG. 1, which is a block diagram illustrating an exemplary power supply system according to an embodiment of the present invention. As shown in FIG. 1, the power supply system 100 may include, but is not limited to, a power conversion circuit 110, a conversion control circuit 120, an auxiliary power module 130, an electricity supply module 140 and a power supply control circuit 150. The power conversion circuit 110 may convert an input power $V_{IN}$ into an output power $V_{OUT}$, wherein the input power $V_{IN}$ and the output power $V_{OUT}$ are an input and an output of the power supply system 100 respectively. In different power supply designs, the input power $V_{IN}$ may be a direct current (DC) voltage or an alternating current (AC) voltage, and the output power $V_{OUT}$ may be a DC voltage or an AC voltage. Additionally, in this embodiment, the power conversion circuit 110 may be regarded as a main power conversion circuit of the power supply system 100, wherein the main power conversion circuit may include circuit blocks generating a main power such as a power factor correction module and a voltage conversion module (not shown in FIG. 1).

The conversion control circuit 120 is coupled to the power conversion circuit 110, and is arranged for controlling an operation of the power conversion circuit 110 according to a control power $P_{CT}$. The control power $P_{CT}$ required by the conversion control circuit 120 may be provided by one of the auxiliary power module 130 and the electricity supply module 140 coupled to the conversion control circuit 120. In this embodiment, the auxiliary power module 130 may selectively output a first electrical power $P_{E1}$ to the conversion control circuit 120, and the electricity supply module 140 may provide a second electrical power $P_{E2}$. The power supply control circuit 150, coupled to the auxiliary power module 130 and the electricity supply module 140, may refer to at least the second electrical power $P_{E2}$ to determine whether to provide the first electrical power $P_{E1}$ or the second electrical power $P_{E2}$ as the control power $P_{CT}$ for the conversion control circuit 120. For example, the power supply control circuit 150 may refer to an amount of the second electrical power $P_{E2}$ to determine whether to provide the first electrical power $P_{E1}$ or the second electrical power $P_{E2}$ for the conversion control circuit 120. In another example, the power supply control circuit 150 may perform calculations on the first electrical power $P_{E1}$ and the second electrical power $P_{E2}$ (e.g. comparing respective energy levels of the first electrical power $P_{E1}$ and the second electrical power $P_{E2}$), and accordingly determine whether to provide the first electrical power $P_{E1}$ or the second electrical power $P_{E2}$ for the conversion control circuit 120.

In a case where the electricity supply module 140 supplies the second electrical power $P_{E2}$ to the conversion control circuit 120, the power supply control circuit 150 may pause/stop the power supply operation of the auxiliary power module 130 to reduce/eliminate power losses caused by the auxiliary power module 130. In addition, as the power supply operation of the electricity supply module 140 may provide the second electrical power $P_{E2}$ without the aid of the power conversion circuit 110, the total power conversion efficiency will not decrease. In other words, replacing the auxiliary power module 130 with the electricity supply module 140 may effectively increase the total power conversion efficiency.

The above is for illustrative purposes only, and is not meant to be a limitation of the present invention. In an alternative design, the power supply control circuit 150 may refer to at least the electric power information of the second electrical power $P_{E2}$ to enable the auxiliary power module 130 to output the first electrical power $P_{E1}$ to the conversion control circuit 120 as a part of the control power $P_{CT}$, and enable the electricity supply module 140 to output the second electrical power $P_{E2}$ to the conversion control circuit 120 as another part of the control power $P_{CT}$. In another alternative design, the power supply control circuit 150 and the conversion control circuit 120 may be integrated as a single control module/circuit to simplify the circuit design. In brief, as long as a power supply system may adaptively output an electric power provided by at least one of the auxiliary power module 130 and the electricity supply module 140 to the conversion control circuit 120, all modifications, alternatives and equivalents fall within the spirit and scope of the present invention.

It should be noted that the electricity supply module 140 may recycle and convert energy within the power supply system 100 to further increase the total power conversion efficiency. For example, the electricity supply module 140 may be implemented by a heat to electricity conversion module, which may convert heat generated during the power supply operation of the power supply system 100 into an electrical energy. In another example, the electricity supply module 140 maybe implemented by a wind power generating module, which may convert a wind energy generated by a fansink module within the power supply system 100 (not shown in FIG. 1) into an electrical energy.

The power supply system 100 shown in FIG. 1 is a basic architecture based on the concept of the present invention. Any circuit employing the architecture shown in FIG. 1 falls within the scope of the present invention. To facilitate an understanding of the present invention, an exemplary implementation is given in the following for further description of the proposed power supply system. It should be noted that other circuit implementations employing the architecture shown in FIG. 1 are feasible. Please refer to FIG. 2, which is an implementation of the power supply system 100 shown in FIG. 1. In this implementation, the power supply system 200 may be implemented by a switching power supply system to provide power required by an electronic apparatus (e.g. a personal computer). The power supply system 200 may include a power conversion circuit 210, a conversion control circuit 220, an auxiliary power module 230, an electricity supply module 240 and a power supply control circuit 250. The power conversion circuit 110, the conversion control circuit 120, the auxiliary power module 130, the electricity supply module 140 and the power supply control circuit 150 shown in FIG. 1 may be implemented by the power conversion circuit 210, the conversion control circuit 220, the auxiliary power module 230, the electricity supply module 240 and the power supply control circuit 250 respectively.

The power conversion circuit 210 may include, but is not limited to, an electromagnetic interference (EMI) filter module 212, a power factor correction (PFC) module 214 and a main power conversion module 216. The EMI filter module 212 may perform filter processing on the input power $V_{IN}$, the PFC module 214 may perform PFC, rectification and voltage boosting on an output of the EMI filter module 212, and the main power conversion module 216 may perform voltage conversion (e.g. a buck operation) and energy conversion on an output of the PFC module 214. In addition, the EMI filter module 212 may provide a start-up voltage $V_{ST}$ for the auxiliary power module 230, and the auxiliary power module 230 may generate the first electrical power $P_{E1}$ accordingly.

The conversion control circuit 220 may include, but is not limited to, a first control module 222 and a second control module 226, wherein at least one of the first control module 222 and the second control module 226 may be implemented by a microcontroller unit (MCU) or a control circuit. In this implementation, the first control module 222 may control the operation of the PFC module 214 according to the control power $P_{CT}$, and the second control module 226 may control the operation of the main power conversion module 216 according to the control power $P_{CT}$.

The electricity supply module 240 maybe implemented by a wind power generating module, and include, but is not limited to, a fansink module 243 (e.g. a cooling fan installed within a power system or a computer case), a wind-driven power generator module 244, a rectifier-regulator module 247 and an energy storage module 248. The fansink module 243 may provide a wind energy $P_{WD}$ to help heat dissipation of circuit elements of the power supply system 200 (e.g. a circuit board or a power device). The wind-driven power generator module 244 is coupled to the fansink module 243, and is arranged for converting the wind energy $P_{WD}$ into the second electrical power $P_{E2}$. For example, when the fansink module 243 operates (e.g. a cooling fan is rotating), great wind forces may result in relative motion between a permanent magnet and a coil within the wind-driven power generator module 244 (not shown in FIG. 2). Hence, the wind-driven power generator module 244 may convert the wind energy $P_{WD}$ into a magnetic energy, and then convert the magnetic energy into the second electrical power $P_{E2}$.

The rectifier-regulator module 247 is coupled to the wind-driven power generator module 244, and is arranged for rectifying and regulating (e.g. boosting or bucking a voltage) the second electrical power $P_{E2}$ to generate a processed second electrical power (also labeled $P_{E2}$ for brevity) in order to ensure power supply quality of the electricity supply module 240. The energy storage module 248 (e.g. a battery unit or a capacitor) is coupled between the rectifier-regulator module 247 and the conversion control circuit 220, and is arranged for storing the processed second electrical power $P_{E2}$. Next, the power supply control circuit 250 may control the energy storage module 248 to transmit the stored second electrical power $P_{E2}$ to the conversion control circuit 220 (the first control module 222 and the second control module 226), and may adaptively pause/stop the power supply operation of the auxiliary power module 230 (e.g. instructing the auxiliary power module 230 to enter a sleep mode) to thereby increase power conversion efficiency.

In one implementation, the power supply system 200 may determine a supply source of the control power $P_{CT}$ according to a voltage level of the second electrical power $P_{E2}$. Refer to FIG. 3 in conjunction with FIG. 2, where FIG. 3 is flowchart illustrating the power supply system 200 determines a supply source of the control power $P_{CT}$ according to the voltage level of the second electrical power $P_{E2}$. Specifically, the power supply control circuit 250 may detect the voltage level of the second electrical power $P_{E2}$ to generate a detection result DR, and refer to the detection result DR to determine whether to output the first electrical power $P_{E1}$ or the second electrical power $P_{E2}$ to the conversion control circuit 220 (the first control module 222 and the second control module 226) as the control power $P_{CT}$. For example, when the detection result DR indicates that the voltage level is greater than a predetermined level, the power supply control circuit 250 may turn off the auxiliary power module 230, and control the electricity supply module 240 (or the energy storage module 248) to output the second electrical power $P_{E2}$ as the control power $P_{CT}$. In another example, when the detection result DR indicates that the voltage level is less than the predetermined level, the power supply control circuit 250 may control the electricity supply module 240 (or the energy storage module 248) to stop outputting the second electrical power $P_{E2}$, and control the auxiliary power module 230 to output the first electrical power $P_{E1}$ as the control power $P_{CT}$.

Figure 2:
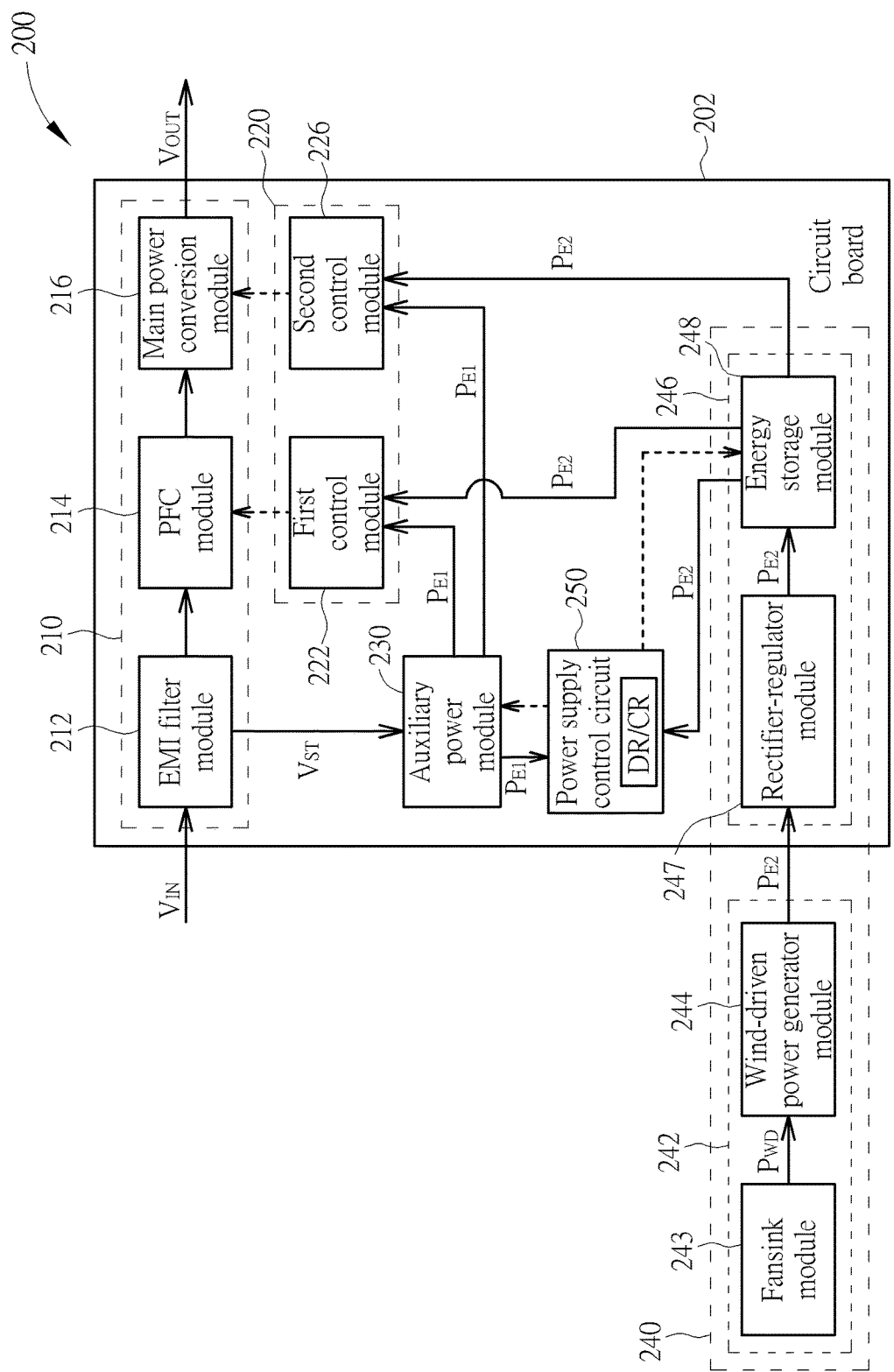
FIG. 2 is an implementation of the power supply system shown in FIG. 1.
Figure 3:
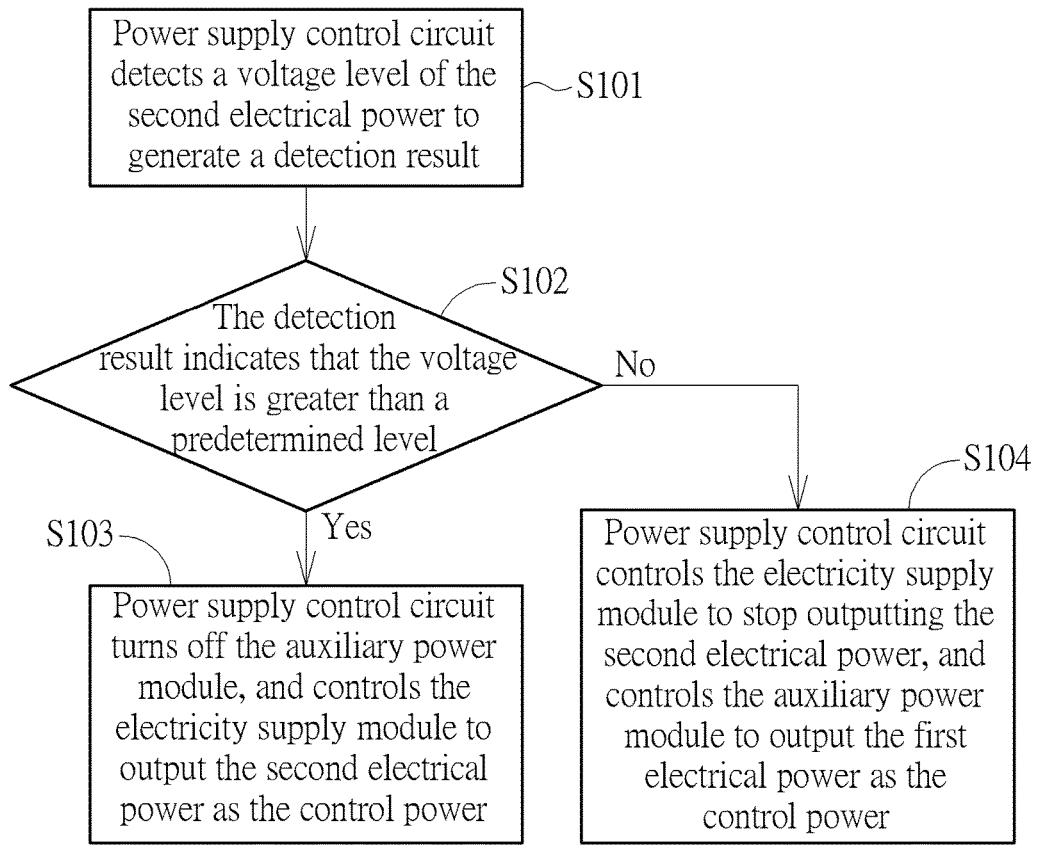
FIG. 3 is flowchart illustrating the power supply system determines a supply source of the control power according to the voltage level of the second electrical power.

In this embodiment, by way of example but not limitation, the power supply control circuit 250 may utilize a gate control device (such as a transistor switch or a metal-oxide-semiconductor field-effect transistor (MOSFET); not shown in FIG. 2) to control activation of the auxiliary power module 230 (i.e. entering or leaving a sleep mode) or control whether or not the auxiliary power module 230 outputs the electrical power $P_{E1}$.

It should be noted that, in an alternative design, the aforementioned control mechanism of the power supply control circuit 250 may be implemented by the conversion control circuit 220. Hence, the power supply control circuit 250 may be optional or integrated into the conversion control circuit 220. For example, at least one of the first control module 222 and the second control module 226 may detect the voltage level of the second electrical power $P_{E2}$ stored in the energy storage module 248, wherein when it is detected that the voltage level is greater than the predetermined level (e.g. energy stored in the energy storage module 248 is almost full), at least one of the first control module 222 and the second control module 226 may turn off the auxiliary power module 230, and the first control module 222 and the second control module 226 may receive the second electrical power $P_{E2}$ from the energy storage module 248 as the control power $P_{CT}$. Additionally, when it is detected that the voltage level is less than the predetermined level (e.g. transition phenomena appear in the voltage level, or the electricity supply module 240 operates abnormally due to damage or malfunction of internal devices thereof), at least one of the first control module 222 and the second control module 226 may turn on/wake up the auxiliary power module 230, and the first control module 222 and the second control module 226 may receive the first electrical power $P_{E1}$ as the control power $P_{CT}$.

In another alternative design, the aforementioned control mechanism of the power supply control circuit 250 may be implemented by the auxiliary power module 230 and the energy storage module 248. For example, the energy storage module 248 may generate an energy indication signal (not shown in FIG. 2) according to the voltage level of the second electrical power $P_{E2}$, wherein when voltage level of the second electrical power $P_{E2}$ is greater than the predetermined level, the auxiliary power module 230 may stop the power supply operation thereof according to the energy indication signal, and when voltage level of the second electrical power $P_{E2}$ is less than the predetermined level, the auxiliary power module 230 may output the first electrical power $P_{E1}$ to the conversion control circuit 220 according to the energy indication signal.

Figure 4:
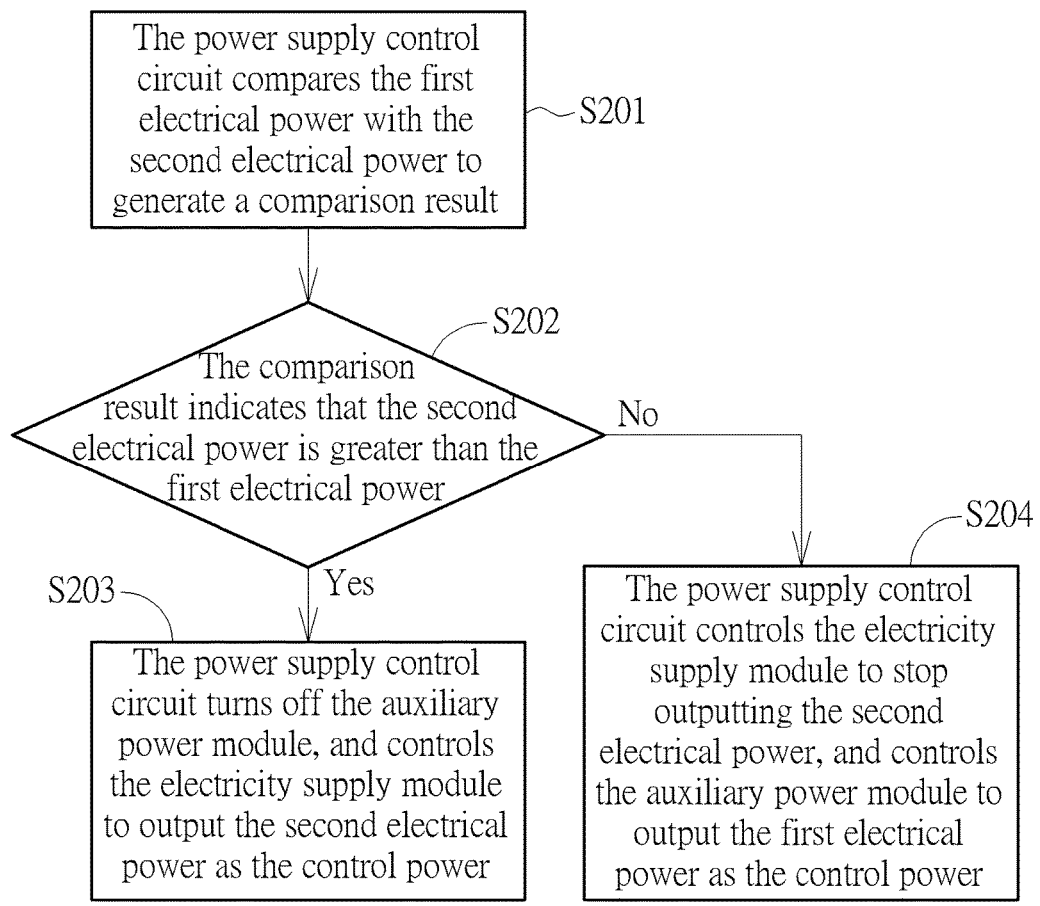
FIG. 4 is flowchart illustrating the power supply system determines a supply source of the control power according to an energy relationship between the first electrical power and the second electrical power.

Further, in one implementation, the power supply system 200 may determine a supply source of the control power $P_{CT}$ according to an energy relationship between the first electrical power $P_{E1}$ and the second electrical power $P_{E2}$. Refer to FIG. 4 in conjunction with FIG. 2, where FIG. 4 is flowchart illustrating the power supply system 200 determines a supply source of the control power $P_{CT}$ according to an energy relationship between the first electrical power $P_{E1}$ and the second electrical power $P_{E2}$. Specifically the power supply control circuit 250 may compare the first electrical power $P_{E1}$ with the second electrical power $P_{E2}$ to generate a comparison result CR, and refer to the comparison result CR to determine whether to output the first electrical power $P_{E1}$ or the second electrical power $P_{E2}$ as the control power $P_{CT}$. For example, when the comparison result CR indicates that the second electrical power $P_{E2}$ is greater than the first electrical power $P_{E1}$, the power supply control circuit 250 may turn off the auxiliary power module 230, and control the electricity supply module 240 (or the energy storage module 248) to output the second electrical power $P_{E2}$ as the control power $P_{CT}$. In another example, when the comparison result CR indicates that the second electrical power $P_{E2}$ is less than the first electrical power $P_{E1}$, the power supply control circuit 250 may control the electricity supply module 240 (or the energy storage module 248) to stop outputting the second electrical power $P_{E2}$, and controls the auxiliary power module 230 to output the first electrical power $P_{E1}$ as the control power $P_{CT}$.

Similarly, in an alternative design, the aforementioned control mechanism of the power supply control circuit 250 may be implemented by the conversion control circuit 220. Hence, the power supply control circuit 250 may be optional or integrated into the conversion control circuit 220. In another alternative design, the aforementioned control mechanism of the power supply control circuit 250 may be implemented by the auxiliary power module 230 and the energy storage module 248 (or the electricity supply module 240).

Please note that the architecture of the electricity supply module 240 shown in FIG. 2 is for illustrative purposes only, and is not meant to be a limitation of the present invention. For example, the fansink module 243 and the wind-driven power generator module 244 may be implemented by a wind energy to electrical power conversion circuit 242, and/or the rectifier-regulator module 247 and the energy storage module may be implemented by a processing circuit 246, wherein the wind energy to electrical power conversion circuit 242 may converting the wind energy $P_{WD}$ into the second electrical power $P_{E2}$, and the processing circuit 246, coupled between the wind energy to electrical power conversion circuit 242 and the conversion control circuit 220, may rectify and store the second electrical power $P_{E2}$. In other words, the fansink module 243 and the wind-driven power generator module 244 may be disposed separately or integrated as a single module.

Additionally, in the embodiment shown in FIG. 2, the power conversion circuit 210, the conversion control circuit 220, the auxiliary power module 230, the processing circuit 246 and the power supply control circuit 250 may be disposed on a circuit board 202, which may realize a power supply having good heat dissipation and optional auxiliary power supply when used together with the wind energy to electrical power conversion circuit 242. Moreover, in the embodiment shown in FIG. 2, circuit elements used for converting a wind energy into an electrical power (i.e. the electricity supply module 240) does not produce power losses in the power conversion circuit 210. Hence, the power supply system 200 may not only increase power conversion efficiency by turning off the auxiliary power module 230, but also increase output power by utilizing the electricity supply module 240 to provide electric power to the conversion circuit 220, wherein the electricity supply module 240 recycles a wind energy (generated due to heat dissipation performed by the fansink module 243) and converts the wind energy to provide the electric power. Hence, the power supply system 200 may satisfy the high level energy-saving specifications (e.g. 80 Plus Platinum/Titanium efficiency level certifications)

To sum up, the proposed power supply system may adaptively turn off an auxiliary power module to reduce power losses, and recycle and reuse energy to increase an output power. Hence, the proposed power supply system may realize a flexible power supply mechanism, and increase power conversion efficiency almost without additional costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply system, comprising:
a power conversion circuit, for converting an input power into an output power, wherein the output power is used as an output of the power supply system;
a conversion control circuit, coupled to the power conversion circuit, the conversion control circuit arranged for controlling an operation of the power conversion circuit according to a control power;
an auxiliary power module, coupled to the conversion control circuit, the auxiliary power module arranged for selectively outputting a first electrical power to the conversion control circuit;
an electricity supply module, coupled to the conversion control circuit, the electricity supply module arranged for providing a second electrical power; and
a power supply control circuit, coupled to the auxiliary power module and the electricity supply module, the power supply control circuit arranged for referring to at least the second electrical power to determine whether to provide the first electrical power or the second electrical power as the control power for the conversion control circuit
wherein the electricity supply module comprises:
a wind energy to electrical power conversion circuit, for converting a wind energy into the second electrical power; and
a processing circuit, coupled between the wind energy to electrical power conversion circuit and the conversion control circuit, the processing circuit arranged for rectifying and storing the second electrical power.

2. The power supply system of claim 1, wherein the power supply control circuit detects a voltage level of the second electrical power to generate a detection result, and refers to the detection result to determine whether to output the first electrical power or the second electrical power to the conversion control circuit as the control power.

3. The power supply system of claim 2, wherein when the detection result indicates that the voltage level is greater than a predetermined level, the power supply control circuit turns off the auxiliary power module, and controls the electricity supply module to output the second electrical power as the control power.

4. The power supply system of claim 2, wherein when the detection result indicates that the voltage level is less than a predetermined level, the power supply control circuit controls the electricity supply module to stop outputting the second electrical power, and controls the auxiliary power module to output the first electrical power as the control power.

5. The power supply system of claim 1, wherein the power supply control circuit compares the first electrical power with the second electrical power to generate a comparison result, and refers to the comparison result to determine whether to output the first electrical power or the second electrical power as the control power.

6. The power supply system of claim 5, wherein when the comparison result indicates that the second electrical power is greater than the first electrical power, the power supply control circuit turns off the auxiliary power module, and controls the electricity supply module to output the second electrical power as the control power.

7. The power supply system of claim 5, wherein when the comparison result indicates that the second electrical power is less than the first electrical power, the power supply control circuit controls the electricity supply module to stop outputting the second electrical power, and controls the auxiliary power module to output the first electrical power as the control power.

8. The power supply system of claim 1, wherein the wind energy to electrical power conversion circuit comprises:
   a fansink module, for providing the wind energy; and
   a wind-driven power generator module, coupled to the fansink module, the wind-driven power generator module arranged for converting the wind energy into the second electrical power.

9. The power supply system of claim 1, wherein the processing circuit comprises:
   a rectifier-regulator module, coupled to the wind energy to electrical power conversion circuit, the rectifier-regulator module arranged for rectifying and regulating the second electrical power to generate a processed second electrical power; and
   an energy storage module, coupled between the rectifier-regulator module and the conversion control circuit, the energy storage module arranged for storing the processed second electrical power.

* * * * *